(12) United States Patent
Sakurada et al.

(10) Patent No.: US 10,583,527 B2
(45) Date of Patent: Mar. 10, 2020

(54) DEVICE AND METHOD FOR MANUFACTURING WELDED SHAPED STEEL

(71) Applicant: NISSHIN STEEL CO., LTD., Tokyo (JP)

(72) Inventors: Yasuhiro Sakurada, Osaka (JP); Tooru Ienari, Osaka (JP); Hiroshi Asada, Osaka (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 471 days.

(21) Appl. No.: 15/153,947

(22) Filed: May 13, 2016

(65) Prior Publication Data

US 2016/0250716 A1 Sep. 1, 2016

Related U.S. Application Data

(63) Continuation of application No. PCT/JP2014/056632, filed on Mar. 13, 2014.

(30) Foreign Application Priority Data

Nov. 14, 2013 (JP) ................................ 2013-235989

(51) Int. Cl.
*B23K 26/21* (2014.01)
*B23K 26/08* (2014.01)
(Continued)

(52) U.S. Cl.
CPC ............ *B23K 26/21* (2015.10); *B23K 9/0256* (2013.01); *B23K 26/0006* (2013.01);
(Continued)

(58) Field of Classification Search
CPC ...... G02B 23/00; G02B 23/02; G02B 25/001; B23K 2101/28; B23K 26/0006;
(Continued)

(56) References Cited

U.S. PATENT DOCUMENTS

| 3,610,869 A | * | 10/1971 | Ito ........................ B23K 13/02 219/77 |
| 4,476,370 A | * | 10/1984 | Kakihara ............. B23K 13/043 219/105 |
| 2012/0125898 A1 | * | 5/2012 | Lee .................... B23K 26/0846 219/121.62 |

FOREIGN PATENT DOCUMENTS

| CN | 102059455 A | 5/2011 |
| JP | 58-138573 A | 8/1983 |

(Continued)

OTHER PUBLICATIONS

JP2012200775_Translation.*
(Continued)

*Primary Examiner* — Tu B Hoang
*Assistant Examiner* — Vy T Nguyen
(74) *Attorney, Agent, or Firm* — R. Lynette Wylie; Apex Juris, pllc.

(57) ABSTRACT

A welded shaped steel manufacturing device includes: a plate conveying device configured to convey a web member and two flange members in a conveyance direction; and a laser welding device configured to laser-weld butt portions of ends of the web member butting against the two flange members for weld-bonding, wherein the plate conveying device includes a web member holding device having surface side rollers arranged at intervals in the conveyance direction in a position not to block laser irradiation from the laser welding device toward welding points, and wherein the web member is held with the surface side rollers over a predetermined range in the conveyance direction, and wherein side ends of the surface side rollers facing the two flange members are positioned along boundaries of areas having spatters dispersed from the welding points in a degree exceeding a predetermined value.

4 Claims, 6 Drawing Sheets

(51) Int. Cl.
*B23K 26/242* (2014.01)
*B23K 9/025* (2006.01)
*B23K 26/00* (2014.01)
*B23K 101/28* (2006.01)

(52) U.S. Cl.
CPC ........ *B23K 26/0838* (2013.01); *B23K 26/242* (2015.10); *B23K 2101/28* (2018.08)

(58) Field of Classification Search
CPC .. B23K 26/0838; B23K 26/21; B23K 26/242; B23K 9/0256
See application file for complete search history.

(56) References Cited

FOREIGN PATENT DOCUMENTS

| | | | |
|---|---|---|---|
| JP | 58-141871 A | | 8/1983 |
| JP | 3-4316 B2 | | 1/1991 |
| JP | 5-50252 A | | 3/1993 |
| JP | 6-142921 A | | 5/1994 |
| JP | 9-192887 A | | 7/1997 |
| JP | 9-290320 A | | 11/1997 |
| JP | 10-128560 A | | 5/1998 |
| JP | 2002-361466 A | | 12/2002 |
| JP | 2007-190589 A | | 8/2007 |
| JP | 2009-119485 A | | 6/2009 |
| JP | 2011-83781 A | | 4/2011 |
| JP | 2011083781 A | * | 4/2011 |
| JP | 2012200775 A | * | 10/2012 |
| JP | 5110642 B2 | | 12/2012 |
| RU | 2208506 C2 | | 7/2003 |
| RU | 2287418 C2 | | 11/2006 |
| WO | 2015-072158 A1 | | 5/2015 |

OTHER PUBLICATIONS

JP2011083781_Translation.*
Office Action and Search Report dated Nov. 10, 2016, in Chinese Patent Application No. 201480061519.9, with English translation, 6 pages.
English Abstract for CN102059455A, Total of 1 page.
English Abstract for JP58-141871A, Total of 1 page.
Office Action dated Mar. 16, 2017, in Canadian Patent Application No. 2930768, 5 pages.
Office Action dated Jul. 26, 2016, in New Zealand Patent Application No. 721141.
Office Action dated Jul. 15, 2014, in Japanese Patent Application No. 2013-235989 (with English translation).
International Search Report, PCT/JP2014/056632, dated Jun. 3, 2014.
Office Action dated Jul. 5, 2017, in Russian Patent Application No. 2016116298 (with English translation).
Extended European Search Report dated Aug. 28, 2017, in European Patent Application No. 14861811.9.
Office Action dated Dec. 1, 2017, in Korean Patent Application No. 10-2016-7015536 (with English translation).
Office Action dated Mar. 7, 2019, in Indian Patent Application No. 201627017701, Total of 6 pages (with English translation).
Office Action dated Jul. 29, 2019, for European Patent Application No. 14861811.9.
Office Action dated May 14, 2019, Brazilian Patent Application No. 1120160107985 (with English Translation).

* cited by examiner

DEVICE AND METHOD FOR MANUFACTURING WELDED SHAPED STEEL

CROSS REFERENCE TO RELATED APPLICATIONS

This is a continuation application of International Patent Application No. PCT/JP2014/056632 filed on Mar. 13, 2014 claiming priority upon Japanese Patent Application No. 2013-235989 filed on Nov. 14, 2013, of which full contents are incorporated herein by reference.

BACKGROUND OF THE INVENTION

Field of the Invention

The present invention relates to a device and a method for manufacturing welded shaped steel by laser-welding a web member and flange members for weld-bonding with laser light as a heat source.

Description of the Background Art

Patent Documents 1, 2 describe methods for manufacturing welded H-shaped steel by laser-welding a web member and flange members for weld-bonding. In the described methods, a web member and two flange members supplied in such a manner that they are arranged in an H shape are laser-welded at predetermined welding positions for weld-bonding.

When a web member and flange members are laser-welded for weld-bonding, it is required that butt-positions of the web member butting against the flange members be set precisely under the constraint that a laser irradiation position is set and a laser beam spot is as small as about 0.6 mm in diameter. The butt positions of the web member butting against the flange members deviate from appropriate positions if the supplied web member is warped or the supplied web member is slanted with respect to the flange members. In this situation, there are probabilities that laser irradiation would not sufficiently melt a matrix and result in insufficient weld-bonding in strength, and that a completed product would have deficiencies in shapes or dimensions. When the web member and the flange members are laser-welded for weld-bonding, therefore, it is required that the butt positions of the web member butting against the flange members do not deviate from appropriate positions.

Patent Document 3 describes a device for high-frequency resistance welding three plate members, which are obtained by unrolling their respective coils and arranged together in an H shape, for weld-bonding. The described device is provided with a supporting device configured to support both surfaces of the web member. This supporting device is constituted by endless belts caused to travel by following travel of the web member conveyed in a line direction. In Patent Document 3, it is described that the supporting device is capable of entirely retaining the web member at a welding portion so that the web member can be prevented from escaping in a thickness direction thereby avoiding welding deficiencies.

PRIOR ART DOCUMENTS

Patent Documents

Patent Document 1: Japanese Patent No. 5110642
Patent Document 2: Japanese Unexamined Patent Application Publication No. 2011-83781
Patent Document 3: Japanese Examined Patent Publication No. H3-4316

Problem to be Solved

When a web member and flange members are laser-welded for weld-bonding so as to manufacture welded H-shaped steel, it can be considered that a supporting device constituted by endless belts described in Patent Document 3 is adopted to prevent butt positions of the web member butting against the flange members from deviating from appropriate positions.

In an area in the vicinity of welding points, however, spatters dispersed from such welding points are large in amount and heat influence generated from such welding points are large in level, and therefore, when a supporting device constituted by endless belts described in Patent Document 3 as a matter of fact, it is required that the endless belts be made of metal or the like and be positioned in the middle of the web member in a width direction, and that the endless belts be narrowed in width and a distance greater than a predetermined value from the welding points be ensured.

There are probabilities, however, that the narrow endless belts positioned in the middle of the web member in a width direction would have difficulties in correcting a slant of the web member with respect to the flange members, and would cause the butt positions of the web member butting against the flange members to deviate from the appropriate positions.

SUMMARY OF THE INVENTION

The objective of the present invention is to provide a welded shaped steel manufacturing device and a welded shaped steel manufacturing method capable of easily make it a reality that a web member can be held in an area where spatters dispersed from laser-welding points are hardly adhered and heat influence is hardly generated from laser-welding points, while the web member can also be held such that butt positions of the web member butting against the flange members do not deviate from appropriate positions.

Means for Solving Problems

A welded shaped steel manufacturing device according to the present invention includes: a plate conveying device configured to convey a web member and two flange members arranged parallel to each other to have the web member interposed therebetween in such a manner that the web member butts perpendicularly against each of the two flange members; and a laser welding device configured to laser-weld butt portions of ends of the web member butting against the two flange members, respectively, for weld-bonding on a conveyance path on which the web member along with the two flange members are conveyed by the plate conveying device. The welded shaped steel manufacturing device is characterized in that the plate conveying device includes: a web member holding device including a plurality of first surface side rollers arranged at intervals in a conveyance direction, such that the plurality of first surface side rollers are allowed to roll on one surface of the web member, in a position not to block laser irradiation toward welding points, and a plurality of second surface side rollers arranged at intervals in a conveyance direction, such that the plurality of second surface side rollers are allowed to roll on the other surface of the web member, in a position not to block laser irradiation toward welding points, thereby holding the web member with the plurality of first surface side rollers and the plurality of second surface side rollers over a predetermined range in a conveyance direction encompassing at least conveyance-direction positions of the welding points therewithin.

According to the welded shaped steel manufacturing device having such a structure, butt positions of the web member butting against the flange members can be supported, in such a manner that the butt positions do not deviate from appropriate positions, by holding the web member between a plurality of rollers on the upper and lower sides. Such rollers can be adjusted such that their respective contact lengths with respect to the web member are selected individually and their respective mounting positions are set individually, which is different in adjustability from endless belts. By virtue of such adjustability, at conveyance-direction positions where the rollers are easily subjected to the adhesion of spatters dispersed and the heat influence generated from the welding points, the rollers can be arranged closer to a centerline of the web member and farther from the welding points, and at conveyance-direction positions where the rollers are hardly subjected to the adhesion of spatters dispersed and the heat influence generated from the welding points, the rollers can be arranged so as to hold the web member at portions as close as possible to side ends of the web member. As a result, the web member can be held in such a manner that the rollers are arranged in areas where they are hardly subjected to the adhesion of spatters dispersed and the heat influence generated from the welding points as well as that the butt positions of the web member butting against the flange members do not deviate from the appropriate positions.

It is preferable that the web member holding device further includes a first supporting frame arranged on one surface side of the web member along a centerline of the web member, the first supporting frame configured to support the plurality of first surface side rollers on both sides thereof, and a second supporting frame arranged on the other surface side of the web member along a centerline of the web member, the second supporting frame configured to support the plurality of second surface side rollers on both sides thereof.

For example, side ends of the plurality of first surface side rollers and side ends of the plurality of second surface side rollers facing the two flange members, respectively, may be positioned along boundaries of a pair of areas each having spatters dispersed from the welding points in a degree exceeding a predetermined value.

According to the welded shaped steel manufacturing device having such a structure, by setting the above-described predetermined value at 0, for example, it could easily be made a reality that the web member is held in such a manner that any rollers are hardly adhered with spatters and the butt positions of the web member butting against the flange members do not deviate from the appropriate positions.

A welded shaped steel manufacturing method according to the present invention includes the steps of: laser-welding butt portions of ends of a web member butting against two flange members, respectively, for weld-bonding on a conveyance path, while conveying the web member along with the two flange members on the conveyance path, in a state where the web member and the two flange members are arranged parallel to each other to have the web member interposed therebetween in such a manner that the web member butts perpendicularly against each of the two flange members, thereby manufacturing a welded shaped steel, the weld-bonding being accompanied with holding the web member, over a predetermined range in a conveyance direction encompassing at least conveyance-direction positions of welding points therewithin, with a plurality of first surface side rollers arranged at intervals in a conveyance direction, such that the plurality of first surface side rollers are allowed to roll on one surface of the web member, in a position not to block laser irradiation toward the welding points, and with a plurality of second surface side rollers arranged at intervals in a conveyance direction, such that the plurality of second surface side rollers are allowed to roll on the other surface of the web member, in a position not to block laser irradiation toward the welding points.

In the above welded shaped steel manufacturing method, it is preferable that the plurality of first surface side rollers are supported by a first supporting frame, on both sides of the first supporting frame, that is arranged on one surface side of the web member along a centerline of the web member, and the plurality of second surface side rollers are supported by a second supporting frame, on both sides of the second supporting frame, that is arranged on the other surface side of the web member along a centerline of the web member.

In the above welded shaped steel manufacturing method, for example, side ends of the plurality of first surface side rollers and side ends of the plurality of second surface side rollers facing the two flange members, respectively, may be positioned along boundaries of a pair of areas each having spatters dispersed from the welding points in a degree exceeding a predetermined value.

Advantageous Effects of the Invention

According to the present invention, it could easily be made a reality that the web member can be held in areas where the spatters dispersed from the laser-welding points are hardly adhered and the heat influence is hardly generated from the laser-welding points, while the web member can also be held such that the butt positions of the web member butting against the flange members do not deviate from the appropriate positions.

BRIEF DESCRIPTION OF THE DRAWINGS

For more thorough understanding of the present invention and advantages thereof, the following descriptions should be read in conjunction with the accompanying drawings in which:

FIG. 5 depicts a cross-sectional view of A-B-C-D of FIG. 1 without showing guide rolls or the like.

FIG. 8B depicts a plan view showing a web member, flange members, laser heads, or the like.

FIG. 9 depicts a schematic view showing a device frame or the like configured to support belt-type web member holding devices, a roller-type web member holding device, guide rolls, and the like.

DESCRIPTION OF EMBODIMENTS OF THE INVENTION

Figure 1:
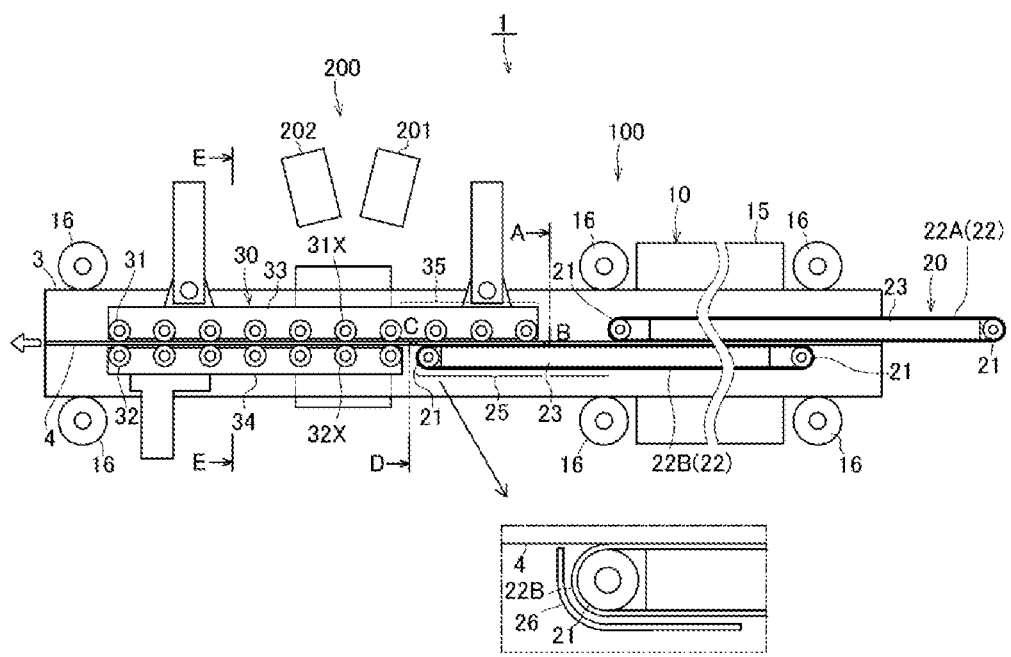
FIG. 1 depicts a side view of a welded shaped steel manufacturing device viewed from a left-hand side with respect to a conveyance direction of a web member and a pair of flange members (hereafter, referred to merely as "conveyance direction"). A flange member on a left-hand side with respect to the conveyance direction out of the pair of flange members and any elements on a further left-hand side of such a flange member are not shown.

Hereafter, a device for manufacturing welded shaped steel and a method for manufacturing welded shaped steel through the use of the device as an embodiment of the present invention will be described with reference to the drawings. In an embodiment, explanations will be provided for the manufacture of H-shaped steel from three steel plates already formed in predetermined dimensions by cutting or the like, arranged so as to have an H-shaped cross-section, and supplied. It is to be noted, hereafter, that a conveyance direction of flange members (2), (3) along with a web member (4) will be referred to as a "conveyance direction," and an upstream side and a downstream side in a conveyance direction will be referred to as an "upstream side" and a "downstream side," respectively.

As shown in FIGS. 1-4, a welded shaped steel manufacturing device (1) includes principally a plate conveying device (100) and a laser welding device (200).

The plate conveying device (100) includes belt-type driving devices (10), belt-type web member holding devices (20), a roller-type web member holding device (30), and the like.

Figure 4:
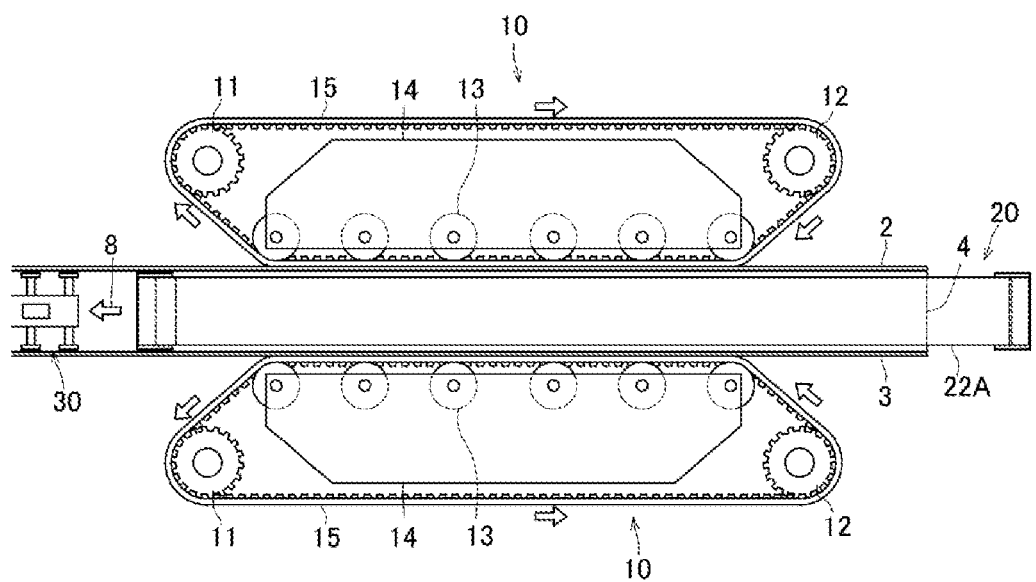
FIG. 4 depicts a plan view of belt-type driving devices.

As shown in FIG. 4, each of the belt-type driving devices (10) includes a driver gear wheel (11) and a follower gear wheel (12) in a longitudinally pairwise manner in a conveyance direction, auxiliary gear wheels (13) arranged in line between such gear wheels (11), (12), a supporting frame (14) configured to rotatably support the auxiliary gear wheels (13), and a resin-made endless belt (15) wound around the gear wheels (11)-(13) on their respective outer peripheries. The endless belt (15) has inner teeth formed on its inner surface engaged with outer teeth formed on outer peripheries of the gear wheels (11)-(13).

These belt-type driving devices (10) are arranged in a laterally pairwise manner on both sides, respectively, of a conveyance path of flange members (2), (3) along with a web member (4). The flange members (2), (3) and the web member (4) are arranged in an H shape, and surfaces of the flange members (2), (3) on sides opposite to a side of the web member (4) are pressed by their respective endless belts (15). The endless belts (15) are caused to travel in a cyclic manner in directions shown by arrows marked in the vicinity thereof in FIG. 4 so as to convey the flange members (2), (3) with the web member (4) interposed therebetween in a direction shown by an arrow (8). The distance between the endless belts (15) of the belt-type driving devices (10) can be adjusted in accordance with a size of the H-shaped steel to be manufactured. As shown in FIG. 1, forward-and-backward sets of upward-and-downward guide rolls (16) arranged in a vertically pairwise manner are further arranged in a longitudinally pairwise manner in a conveyance direction across the endless belts (15) so that the flange members (2), (3) are fixed in a vertical position.

There are further pair of belt-type driving devices (10) (not shown) arranged downstream from a roller-type web member holding device (30), which will be described later, across the conveyance path of the H-shaped steel.

Figure 5:
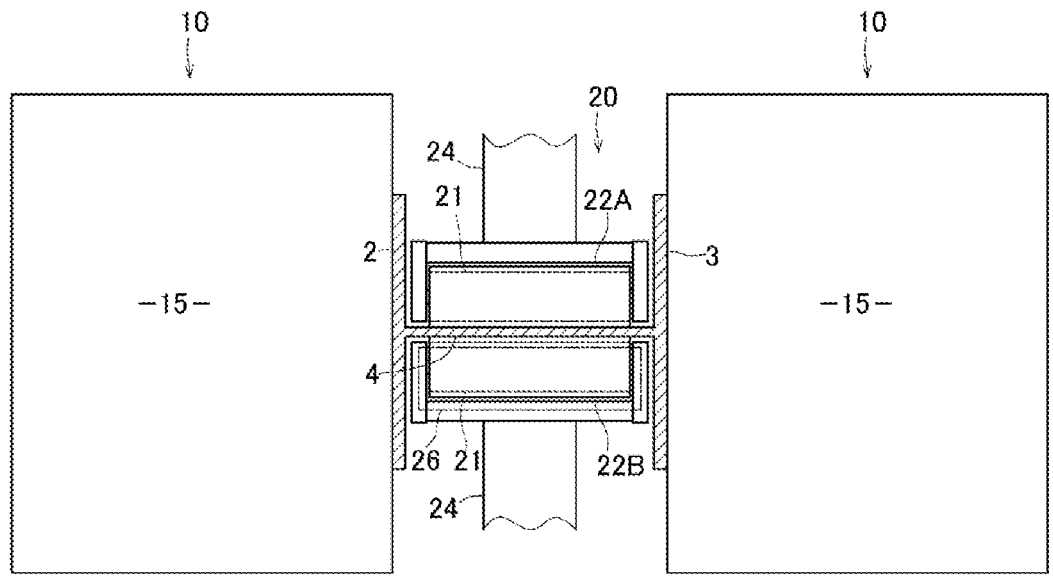
Figure 6:
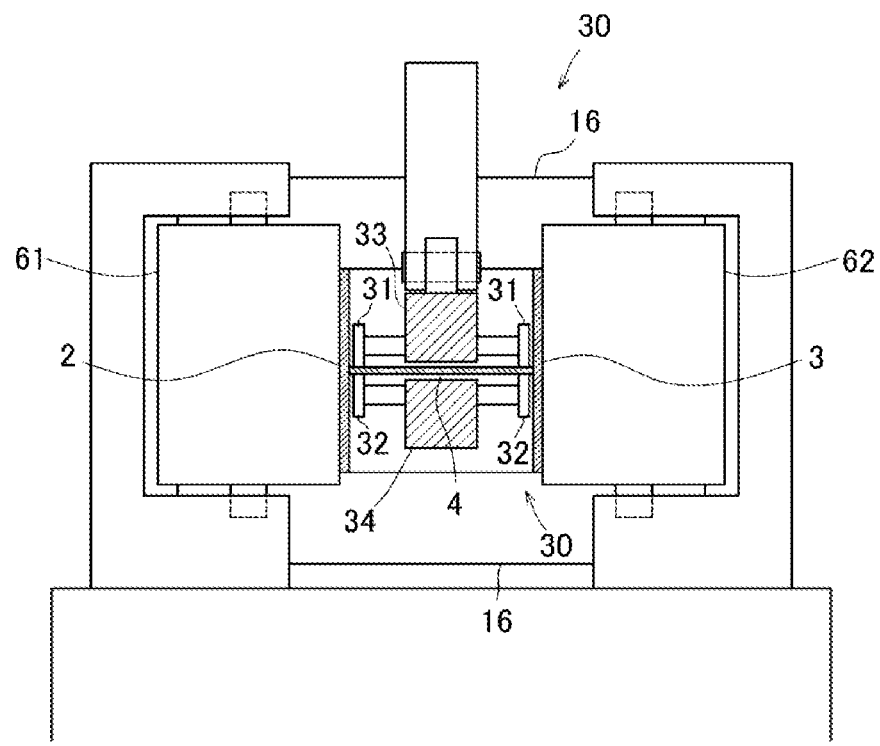
FIG. 6 depicts a cross-sectional view of E-E of FIG. 1.

As shown in FIGS. 1, 5, each of the belt-type web member holding devices (20) includes a front roller and a back roller (21) arranged longitudinally in a conveyance direction, a web member holding belt (22) constituted by a resin-made endless belt wound around the two rollers (21), a supporting plate (23) arranged between the two rollers (21) so as to support the web member holding belt (22) from an underside, and supporting frames (24) (see FIG. 5). The supporting frames (24) are configured to rotatably support the two rollers (21) and also support the supporting plate (23).

The belt-type web member holding devices (20) are arranged on both sides (topside and underside) of the web member (4), respectively. The belt-type web member holding devices (20) are configured to hold the web member (4) in a thickness direction with their respective web member holding belts (22). Because the two rollers (21) are follower rollers, each of the web member holding belts (22) travels in a cyclic manner around such two rollers (21) to follow the conveyed web member (4) interposed between the flange members (2), (3). A vertical position of the web member holding belt (22) arranged on the upper side of the web member (4) can be adjusted in accordance with a desired size of the H-shaped steel to be manufactured. Hereafter, the web member holding belt (22) arranged on the upper surface side (one surface side) with respect to the web member (4) will be referred to as "upper web member holding belt" (22A), and the web member holding belt (22) arranged on the lower surface side (the other surface side) with respect to the web member (4) will be referred to as "lower web member holding belt" (22B).

As shown in an enlarged view in FIG. 1, a downstream side end of the lower web member holding belt (22B) is provided with a cover (26). The cover (26) is configured in shape such that it can block spatters generated directly from welding points on a downstream side or spatters generated and thereafter bounced off some members, and the cover (26) is made of heat-resistant material such as metal. The cover (26) can sufficiently protect the resin-made lower web member holding belt (22B) from heat influence of the generated spatters. The reason why the lower web member holding belt (22B) extends beyond the upper web member holding belt (22A) toward a downstream side will be described later. It is to be noted that, if necessary, a downstream side end of the upper web member holding belt (22A) may be covered.

As shown in FIGS. 1-3, 6, the roller-type web member holding device (30) includes a plurality of rollers (31) allowed to roll along an upper surface (one surface) of the web member (4) in a conveyance direction (hereafter, referred to as "first surface rollers" (31)), a plurality of rollers (32) allowed to roll along a lower surface (the other surface) of the web member (4) in a conveyance direction (hereafter, referred to as "second surface rollers" (32)), a first supporting frame (33) configured to support the first surface rollers (31), and a second supporting frame (34) configured to support the second surface rollers (32). The first supporting frame (33) extends along a centerline (7) of the web member (4) in a conveyance direction over a predetermined length, and supports the first surface rollers (31) at both sides of the first supporting frame (33) in such a manner that the first surface rollers (31) are arranged at intervals in a conveyance direction. The second supporting frame (34) also extends along a centerline (7) of the web member (4) in a conveyance direction over a predetermined length (shorter than a length of the first supporting frame (33) in this embodiment), and supports the second surface rollers (32) at both sides of the second supporting frame (34) in such a manner that the second surface rollers (32) are arranged at intervals in a conveyance direction. The rollers (31), (32) and the supporting frames (33), (34) described above are arranged in positions not to block laser irradiation toward welding points (5), (6). For the rollers (31), (32) and the supporting frames (33), (34), heat-resistant material such as metal is adopted.

With the first surface rollers (31) and the second surface rollers (32), the roller-type web member holding device (30) holds the web member (4) in a thickness direction over a predetermined range in a conveyance direction encompassing at least conveyance-direction positions of the welding points (5), (6) therewithin. In order to suppress a slant of the web member (4) with respect to the flange members (2), (3) as small as possible in conveyance-direction positions of the welding points (5), (6), sets of two first surface rollers (31X) and sets of two second surface rollers (32X) are arranged on both sides of the web member (4), respectively, in such a manner that the two first surface rollers (31X) are arranged across a centerline (7) in conveyance-direction positions of the welding points (5), (6), and the two second surface rollers (32X) are arranged across a centerline (7) in conveyance-direction positions of the welding points (5), (6).

Figure 2:
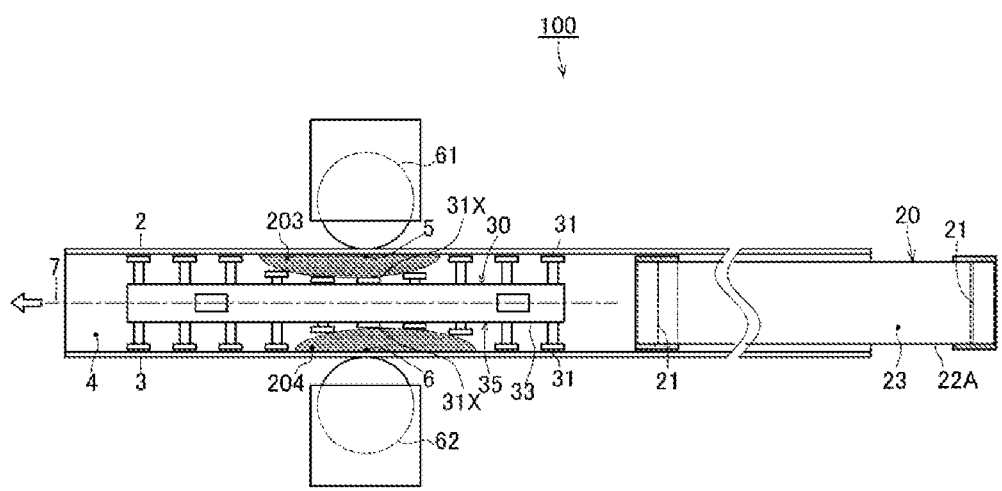
FIG. 2 depicts a plan view of a roller-type web member holding device on an upper side and a belt-type web member holding device on an upper side. The "upper side" indicates a side of a laser welding device (200) with respect to a web member (4) in FIG. 1.
Figure 3:
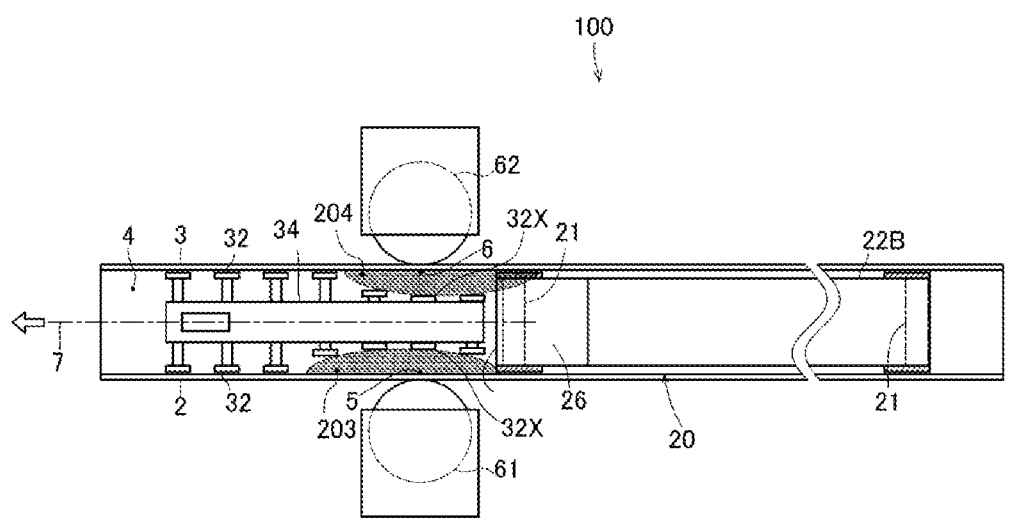
FIG. 3 depicts a plan view of the roller-type web member holding device on a lower side and a belt-type web member holding device on a lower side. The "lower side" indicates a side opposite to the above-described "upper side" with respect to the web member (4).

Side ends of the first surface rollers (31) and side ends of the second surface rollers (32) facing the flange members (2), (3), respectively, are positioned along boundaries of a pair of areas each having spatters dispersed from the welding points (5), (6) in a degree exceeding a predetermined value. The degree of the dispersed spatters can be defined as the amount (mass) of the adhered spatters per unit area, which adhered spatters are spatters dispersed and then adhered to the upper surface or the lower surface of the web member (4) within a predetermined period of welding time. In this embodiment, explanations will be provided for the case that the above-described predetermined value is set at zero. In other words, such a case is the case that side ends of the first surface rollers (31) and side ends of the second surface rollers (32) facing the flange members (2), (3), respectively, are positioned along boundaries of areas (203), (204) where spatters are dispersed. It is to be noted that, for the rollers (31), (32) arranged in conveyance-direction positions where spatters are not dispersed, are actually positioned as close as possible to side ends of the web member (4), as shown in FIGS. 2, 3, in order to suppress a slant of the web member (4) with respect to the flange members (2), (3) as small as possible.

Figure 7A:
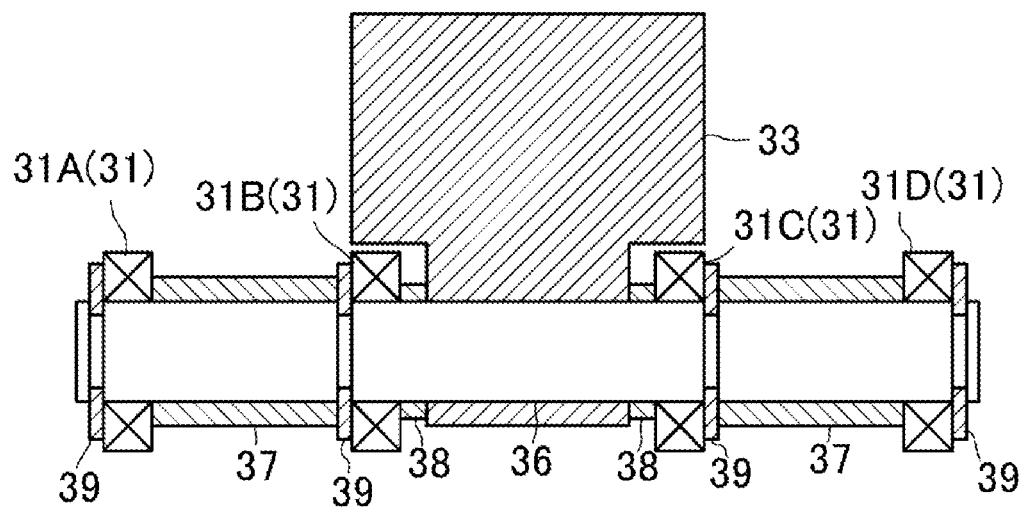
FIG. 7A depicts a cross-sectional view of one structural example of a first supporting frame configured to support first surface side rollers.
Figure 7B:
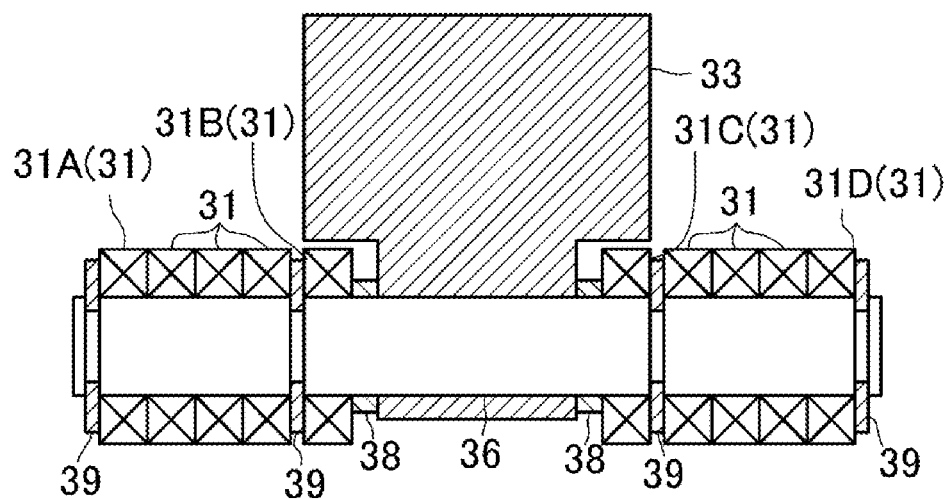
FIG. 7B depicts a cross-sectional view of another structural example of a first supporting frame configured to support first surface side rollers.

FIG. 7A shows an example of a supporting structure for the first surface rollers (31). A ball bearing is adopted for the first surface rollers (31), and the supporting frame (33) has a shaft (36) penetrated therethrough in a direction perpendicular to a conveyance direction and in a horizontal position. The shaft (36) has four first surface rollers (31A)-(31D) fitted thereon at intervals. Cylindrical collars (37) are fitted onto the shaft (36) around its circumferential surface between the first roller (31A) and the second roller (31B), and between the third roller (31C) and the fourth roller (31D). Further, short cylindrical collars (38) are fitted onto the shaft (36) around its circumferential surface between the second roller (31B) and one side surface of the first supporting frame (33), and between the third roller (31C) and the other side surface of the first supporting frame (33). Still further, snap rings (39) are fitted into circumferential grooves formed on a circumferential surface of the shaft (36) at its predetermined positions in order to fix the rollers (31A)-(31D), in axial-direction positions, with respect to the first supporting frame (33). As shown in FIG. 7B, the collars (37) may be replaced with a plurality of first surface rollers (31) arranged side by side. A contact length of the first surface rollers (31) as an example shown in FIG. 7B with respect to the web member (4) is four times larger than that as an example in FIG. 7A.

A supporting structure for the second surface rollers (32) may be configured in a manner similar to the supporting structure for the first surface rollers (31), and therefore, no further descriptions thereof will be provided in detail.

In this embodiment, as shown in FIG. 1, the first supporting frame (33) extends beyond the second supporting frame (34) by a predetermined length toward an upstream side, and an elongated portion (35) thereof has also upstream-side rollers (31) arranged thereon. On the other hand, in the belt-type web member holding devices (20), a downstream side end of the lower web member holding belt (22B) extends beyond a downstream side end of the upper web member holding belt (22A) by a predetermined length toward a downstream side. As a result, the web member (4) is held in a thickness direction between: an elongated portion (25) of the lower web member holding belt (22B); and the upstream-side rollers (31) of the elongated portion (35) of the first supporting frame (33). On the lower surface side of the web member (4), an area where spatters are dispersed is narrower than that on the upper surface side due to the circumstances where the spatters fall off from the lower surface side. There are probabilities, therefore, that the lower web member holding belt (22B) is caused by covering its downstream side end with the cover (26) described above to extend to a position closer to the welding points (5), (6) in comparison with the upper web member holding belt (22A). According to such a configuration, the rollers (32) against the web member (4) through line-contact support is less likely to generate flaws on a surface of the web member (4) in comparison with the web member holding belt (22B) against the web member (4) through plane-contact support, thereby improving the manufactured H-shaped steel in quality. It is to be noted that an upstream side end of the first supporting frame (33) and an upstream side end of the second supporting frame (34) may be matched in a conveyance-direction position, and that a downstream side end of the upper web member holding belt (22A) and a downstream side end of the lower web member holding belt (22B) may be matched in a conveyance-direction position. A downstream side end of the upper web member holding belt (22A) and/or a downstream side end of the lower web member holding belt (22B) may be covered with the cover (26), if appropriate.

As shown in FIGS. 2, 3, a pair of squeeze rolls (61), (62) are arranged in such a manner that surfaces of the flange members (2), (3) on sides opposite to a side of the web member (4) are pressed by them from both sides in the vicinity of the welding points (5), (6). The distance between such a pair of squeeze rolls (61), (62) can be adjusted in accordance with a size of the H-shaped steel to be manufactured.

Figure 8A:
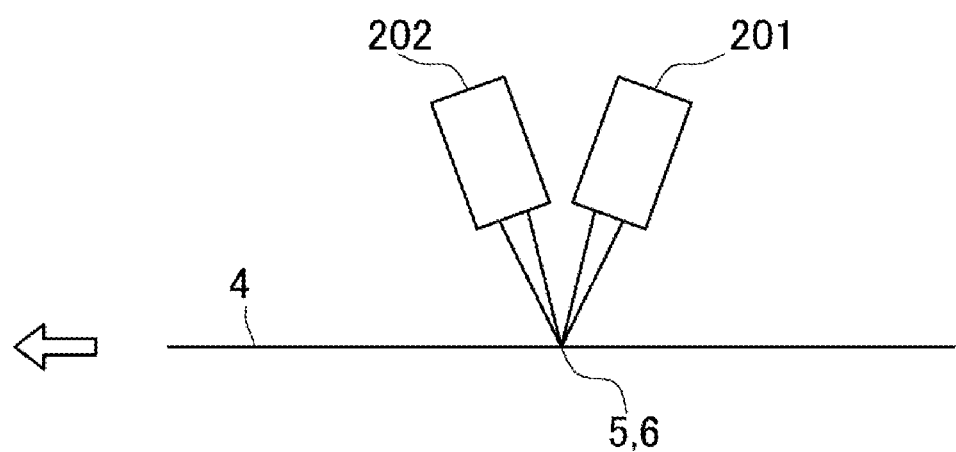
FIG. 8A depicts a view of a web member, laser heads, or the like viewed from a left-hand side with respect to the conveyance direction.
Figure 8B:
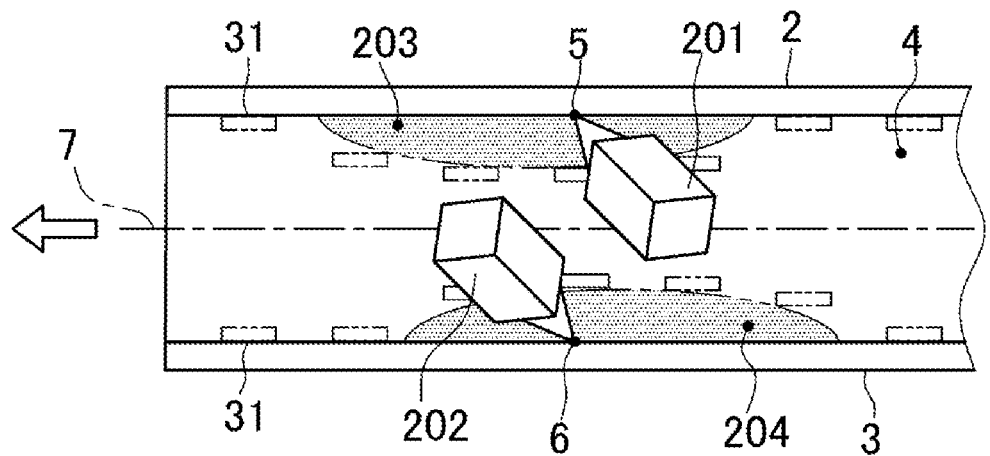

The laser welding device (200) is configured to laser-weld butt portions of ends of the web member (4) butting against the flange members (2), (3), respectively, for weld-bonding on a conveyance path on which the flange members (2), (3) along with the web member (4) are conveyed by the plate conveying device (100). In this embodiment, the laser welding device (200) emits laser lights from two laser heads (201), (202) arranged on the upper surface side (one surface side) of the web member (4). The laser heads (201), (202) are arranged such that the welding points (5), (6) are in conveyance-direction positions the same as each other, however, the laser heads (201), (202) irradiate the welding points (5), (6) with laser lights in irradiation directions different from each other to prevent interference in laser lights between the laser heads (201), (202). FIGS. 8A, 8B show an example in which one laser head (201) configured to irradiate one end of the web member (4) and one flange member (2) with laser light for weld-bonding in a direction inclined closer to the web member (4) toward a downstream side as well as a side of the one flange member (2), and the other laser head (202) configured to irradiate the other end of the web member (4) and the other flange member (3) with laser light for weld-bonding in a direction inclined closer to the web member (4) toward an upstream side as well as a side of the other flange member (3). As a result, two welding points (5), (6) are in conveyance-direction positions the same as each other; nevertheless, two spattering areas are asymmetric with respect to a centerline (7) of the web member (4), where the two spattering areas include a spattering area (203) generated from the welding point (5) by the laser head (201) and a spattering area (204) generated from the welding point (6) by the laser head (202).

The above-described arrangement of the laser heads (201), (202) is not the sole arrangement for generating two spattering areas (203), (204) asymmetric with respect to a centerline (7) of the web member (4). For example, if the laser heads (201), (202) are arranged in an asymmetric manner with respect to a plane aligned with a centerline (7) perpendicular to upward/downward surfaces of the web member (4), and if two welding points are in conveyance-direction positions the same as each other, two spattering areas (203), (204) are eventually asymmetric with respect to the centerline (7) of the web member (4) at a high probability. Furthermore, if two welding points (5), (6) in conveyance-direction positions different from each other, two spattering areas (203), (204) are also asymmetric with respect to the centerline (7) of the web member (4).

Figure 9:
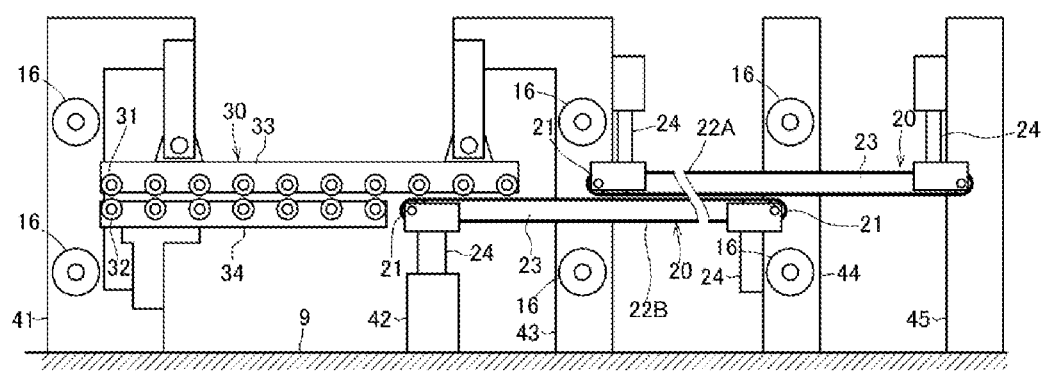

FIG. 9 is a schematic view showing an example of a supporting structure for the belt-type web member holding devices (20), the roller-type web member holding device (30), the guide rolls (16), and the like. The supporting frames (24) of the belt-type web member holding device (20) arranged on an upper side with respect to the web member (4) are supported by device frames (43), (45), respectively, provided with a jack mechanism or the like (not shown) capable of adjusting a height of a portion including the upper web member holding belt (22A). The supporting frames (24) of the belt-type web member holding device (20) arranged on a lower side of the web member (4) are supported by device frames (42), (44), respectively. A first supporting frame (33) of the roller-type web member holding device (30) is supported by the device frame (43) and another device frame (41) provided with a jack mechanism or the like (not shown) capable of adjusting a height of the first supporting frame (33). A second supporting frame (34) of the roller-type web member holding device (30) is supported by the device frame (41). The guide rolls (16) are rotatably supported by the device frames (41), (43), (44), respectively. In particular, the guide rolls (16) on the upper side configured to hold upper ends of the flange members (2), (3) are supported by the device frames (41), (43), (44), respectively, such that a height position of each of the upper guide rolls (16) can be adjusted.

When H-shaped steel is manufactured by the welded shaped steel manufacturing device (1) having the above-described structure, initially, flange members (2), (3) and a web member (4) arranged so as to have an H-shaped cross-section are supplied from an upstream side to the belt-type driving devices (10) and the belt-type web member holding devices (20) while the endless belts (15) of the belt-type driving devices (10) are caused to travel in a cyclic manner. The flange members (2), (3) and the web member (4) are then conveyed to the roller-type web member holding device (30) in such a manner that they are arranged so as to have the H-shaped cross-section.

When the flange members (2), (3) and the web member (4) reach the roller-type web member holding device (30), the web member (4) is held by the first and second surface rollers (31), (32) in a vertical direction across the welding points (5), (6) in a conveyance direction, and the flange members (2), (3) are held by the squeeze rolls (61), (62) in a lateral direction in the vicinity of the welding points (5), (6). In a state where they are held between the rollers (31), (32) as well as between the rolls (61), subsequently, both side ends of the web member (4) are laser-welded by the laser welding device (200) to the two flange members (2), (3), respectively, for weld-bonding.

The laser-welded flange members (2), (3) and the web member (4) are conveyed toward a downstream side by the roller-type web member holding device (30), and are then conveyed toward a further downstream side by another pair of belt-type driving devices arranged on a further downstream side, and are subsequently subjected to predetermined treatments (e.g. correction of welding distortion, soot removal, and the like).

According to the welded shaped steel manufacturing device (1) and the method as embodiments as described above, the web member (4) is held between a plurality of upper and lower rollers (31), (32), and therefore, butt positions of the web member (4) butting against the flange members (2), (3) can be supported in such a manner that the butt positions do not deviate from appropriate positions. The contact lengths between the rollers and the web member can be selected individually, and the mounting positions of the rollers can be set individually. By virtue of such adjustability, at conveyance-direction positions where the rollers are easily subjected to the adhesion of spatters dispersed and the heat influence generated from the welding points (5), (6), the rollers (31), (32) can be arranged closer to a centerline (7) of the web member (4) and farther from the welding points (5), (6). On the other hand, at conveyance-direction positions where the rollers are hardly subjected to the adhesion of spatters dispersed and the heat influence generated from the welding points (5), (6), the rollers (31), (32) can be arranged so as to hold the web member (4) at positions as close as possible to side ends of the web member (4). As a result, the web member (4) can be held by the rollers (31), (32) in areas where they are hardly subjected to the adhesion of spatters dispersed and the heat influence generated from the welding points (5), (6), and in such a manner that the butt positions of the web member (4) butting against the flange members (2), (3) do not deviate from the appropriate positions. This would be impossible if the web member is held by the endless belts as in the previous examples.

In the welded shaped steel manufacturing device (1) as an embodiment, side ends of the first and second surface rollers (31), (32) facing the flange members (2), (3) are positioned along boundaries of a pair of areas (203), (204) each having spatters dispersed. As a result, portions of the web member (4) at positions as close as possible to side ends thereof can be held by the rollers (31), (32) in such a manner that the rollers (31), (32) are hardly subjected to the adhesion of spatters dispersed from the welding points (5), (6).

OTHER EMBODIMENTS

In an embodiment described above, side ends of the first and second surface rollers (31), (32) facing the flange members (2), (3) are positioned along boundaries of a pair of areas each having spatters dispersed from the welding points (5), (6) in a degree exceeding a predetermined value (zero). However, the side ends may instead be positioned along boundaries of a pair of areas each being subjected to heat influence generated from the welding points (5), (6) in a degree exceeding a predetermined value. The degree of heat influence generated from the welding points (5), (6) can be defined as the amount of heat received by the rollers (31), (32) in the positions from heat sources within a predetermined period of welding time. The areas where the degree of heat influence generated from the welding points (5), (6) exceeds a predetermined value may, for example, be the areas where the temperature of the rollers (31), (32) exceeds the maximum allowable temperature.

In an embodiment described above, the web member (4) is held by the belt-type web member holding devices (20) on an upstream side, and held by the roller-type web member holding device (30) on a downstream side. However, the belt-type web member holding devices (20) may be excluded, and the roller-type web member holding device (30) may hold alone the web member (4) on an upstream side and a downstream side.

In FIG. 1, the laser heads (201), (202) are both arranged on an upper side with respect to the web member (4). However, the laser heads may be arranged on sides different from each other with respect to the web member (4).

In the accompanying drawings, the first surface rollers (31) and the second surface rollers (32) are in positions the same as each other when viewed from above. However, the rollers may be in positions different from each other when viewed in the same manner.

Figure 7C:
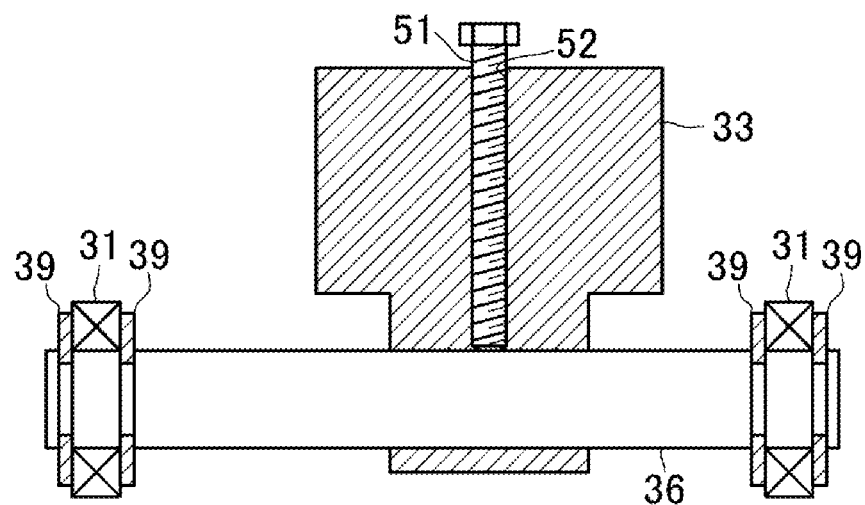
FIG. 7C depicts a cross-sectional view of another structural example of a first supporting frame configured to support first surface side rollers.

In an embodiment described above, as shown in FIGS. 7A, 7B, a shaft (36) is fixed in an axial direction with respect to the supporting frame (33). However, the shaft (36) may be adjustable in an axial direction with respect to the supporting frame (33). FIG. 7C shows an example in which the supporting frame (33) is perforated with a threaded hole (52) from an outside to the shaft (36) horizontally and perpendicularly to a conveyance direction to penetrate therethrough so that a bolt (51) is driven into the threaded hole (52) to fix a position of the shaft (36) in an axial direction. Such a configuration is convenient for arranging two rollers (31) that are asymmetric with respect to a centerline (7). The configuration may be adopted for the second supporting frame (34) and the second surface rollers (32) in a similar manner.

INDUSTRIAL APPLICABILITY

The present invention can, for example, be applied to a device and a method for manufacturing welded H-shaped steel.

REFERENCE NUMERALS

1 Welded shaped steel manufacturing device
2 Flange member
3 Flange member
4 Web member
5 Welding point
6 Welding point
7 Centerline of the web member
30 Roller-type web member holding device (web member holding device)
31 First surface rollers
32 Second surface rollers
33 First supporting frame
34 Second supporting frame
100 Plate conveying device
200 Laser welding device
203 Spattering area
204 Spattering area

What is claimed is:

1. A welded shaped steel manufacturing device comprising:
a plate conveying device configured to convey a web member having two opposite surfaces and two flange members arranged parallel to each other to have the web member interposed therebetween in such a manner that the web member butts perpendicularly against each of the two flange members; and
a laser welding device configured to laser-weld butt portions of ends of the web member butting against the two flange members, respectively, for weld-bonding on a conveyance path on which the web member along with the two flange members are conveyed by the plate conveying device, wherein
spatters are dispersed, within a pair of specified areas around welding points, as a result of laser-welding in a degree exceeding a predetermined value,
said plate conveying device comprising
a web member holding device including
a plurality of first surface side rollers arranged on a one surface of the two opposite surfaces of the web member at intervals in a conveyance direction, such that the plurality of first surface side rollers are allowed to roll on the one surface of the web member, in a position not to block laser irradiation toward the welding points, and
a plurality of second surface side rollers arranged on another surface of the two opposite surfaces of the web member at intervals in a conveyance direction, such that the plurality of second surface side rollers are allowed to roll on the other surface of the web member, in a position not to block laser irradiation toward the welding points,
thereby holding the web member with the plurality of first surface side rollers and the plurality of second surface side rollers over a predetermined range in a conveyance direction encompassing at least conveyance-direction positions of the welding points therewithin,
wherein side ends of the plurality of first surface side rollers and side ends of the plurality of second surface side rollers facing the two flange members, respectively, are positioned along boundaries of the pair of specified areas such that the side ends of the plurality of first and second surface side rollers facing the two flange members are adjustably positioned closer to a centerline of the web member in a width direction when conveyance-direction positions of the surface side rollers are inside the pair of specified areas in comparison with the side ends of the plurality of first and second surface side rollers facing the two flange members being proximate to butt portions of the web member in the width direction butting against the two flange members when conveyance-direction positions of the surface side rollers are outside the pair of specified areas.

2. A welded shaped steel manufacturing device comprising:

a plate conveying device configured to convey a web member having two opposite surfaces and two flange members arranged parallel to each other to have the web member interposed therebetween in such a manner that the web member butts perpendicularly against each of the two flange members; and a laser welding device configured to laser-weld butt portions of ends of the web member butting against the two flange members, respectively, for weld-bonding on a conveyance path on which the web member along with the two flange members are conveyed by the plate conveying device, wherein heat influence is exerted on, within a pair of specified areas around welding points, as a result of laser-welding in a degree exceeding a predetermined value, said plate conveying device comprising a web member holding device including a plurality of first surface side rollers arranged on a one surface of the two opposite surfaces of the web member at intervals in a conveyance direction, such that the plurality of first surface side rollers are allowed to roll on the one surface of the web member, in a position not to block laser irradiation toward the welding points, and a plurality of second surface side rollers arranged on an other surface of the two opposite surfaces of the web member at intervals in a conveyance direction, such that the plurality of second surface side rollers are allowed to roll on the other surface of the web member, in a position not to block laser irradiation toward the welding points, thereby holding the web member with the plurality of first surface side rollers and the plurality of second surface side rollers over a predetermined range in a conveyance direction encompassing at least conveyance-direction positions of the welding points therewithin, wherein side ends of the plurality of first surface side rollers and side ends of the plurality of second surface side rollers facing the two flange members, respectively, are positioned along boundaries of the pair of specified areas such that the side ends of the plurality of first and second surface side rollers facing the two flange members are adjustably positioned closer to a centerline of the web member in a width direction when conveyance-direction positions of the surface side rollers are inside the pair of specified areas in comparison with the side ends of the plurality of first and second surface side rollers facing the two flange members being proximate to butt portions of the web member in the width direction butting against the two flange members when conveyance-direction positions of the surface side rollers are outside the pair of specified areas.

3. A welded shaped steel manufacturing method comprising the steps of:

laser-welding, by a laser welding device, butt portions of ends of a web member butting against two flange members, respectively, for weld-bonding on a conveyance path, while conveying, by a plate conveying device, the web member along with the two flange members on the conveyance path, in a state where the web member and the two flange members are arranged parallel to each other to have the web member interposed therebetween in such a manner that the web member butts perpendicularly against each of the two flange members, wherein spatters are dispersed, within a pair of specified areas around welding points, as a result of laser-welding in a degree exceeding a predetermined value, thereby manufacturing a welded shaped steel, said weld-bonding being accompanied with holding the web member, over a predetermined range in a conveyance direction encompassing at least conveyance-direction positions of the welding points therewithin, with a plurality of first surface side rollers, of a web member holding device, arranged on a one surface of two opposite surfaces of the web member at intervals in a conveyance direction, such that the plurality of first surface side rollers are allowed to roll on the one surface of the web member, in a position not to block laser irradiation toward the welding points, and with a plurality of second surface side rollers, of the web member holding device, arranged on an other surface of the two opposite surface of the web member at intervals in a conveyance direction, such that the plurality of second surface side rollers are allowed to roll on the other surface of the web member, in a position not to block laser irradiation toward the welding points, wherein side ends of the plurality of first surface side rollers and side ends of the plurality of second surface side rollers facing the two flange members, respectively, are positioned along boundaries of the pair of specified areas such that the side ends of the plurality of first and second surface side rollers facing the two flange members are adjustably positioned closer to a centerline of the web member in a width direction when conveyance-direction positions of the surface side rollers are inside the pair of specified areas in comparison with the side ends of the plurality of first and second surface side rollers facing the two flange members being proximate to butt portions of the web member in the width direction butting against the two flange members when conveyance-direction positions of the surface side rollers are outside the pair of specified areas.

4. A welded shaped steel manufacturing method comprising the steps of:

laser-welding, by a laser welding device, butt portions of ends of a web member butting against two flange members, respectively, for weld-bonding on a conveyance path, while conveying, by a plate conveying device, the web member along with the two flange members on the conveyance path, in a state where the web member and the two flange members are arranged parallel to each other to have the web member interposed therebetween in such a manner that the web member butts perpendicularly against each of the two flange members, wherein heat influence is exerted on, within a pair of specified areas around welding points, as a result of laser-welding in a degree exceeding a predetermined value, thereby manufacturing a welded shaped steel, said weld-bonding being accompanied with holding the web member, over a predetermined range in a conveyance direction encompassing at least conveyance-direction positions of the welding points therewithin, with a plurality of first surface side rollers, of a web member holding device, arranged on a one surface of two opposite surfaces of the web member at intervals in a conveyance direction, such that the plurality of first surface side rollers are allowed to roll on the one surface of the web member, in a position not to block laser irradiation toward the welding points, and with a plurality of second surface side rollers, of the web member holding device, arranged on an other surface of the two opposite surfaces of the web member at intervals in a conveyance direction, such that the plurality of second surface side rollers are allowed to roll on the other surface of the web member, in a position not to block laser irradiation toward the welding points, wherein side ends of the plurality of first surface side rollers and side ends of the plurality of second surface side rollers facing the two flange members, respectively, are adjustably positioned along boundaries of the pair of specified areas such that the side ends of the plurality of first and second surface side rollers facing the two flange members are positioned closer to a centerline of the web member in a width direction when conveyance-direction positions of the surface side rollers are inside the pair of specified areas in comparison with the side ends of the plurality of first and second surface side rollers facing the two flange members being proximate to butt portions of the web member in the width direction butting against the two flange members when conveyance-direction positions of the surface side rollers are outside the pair of specified areas.

* * * * *